(12) United States Patent
Aitken (10) Patent No.: US 9,828,283 B1
(45) Date of Patent: Nov. 28, 2017

(54) KANOITE GLASS-CERAMICS

(71) Applicant: Corning Incorporated, Corning, NY (US)

(72) Inventor: Bruce Gardiner Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/223,567

(22) Filed: Jul. 29, 2016

(51) Int. Cl.
*C03C 10/04* (2006.01)
*C03B 32/02* (2006.01)
*C03C 10/00* (2006.01)
*C03C 3/062* (2006.01)

(52) U.S. Cl.
CPC .......... *C03C 10/0045* (2013.01); *C03B 32/02* (2013.01); *C03C 3/062* (2013.01); *C03C 2204/00* (2013.01)

(58) Field of Classification Search
None
See application file for complete search history.

(56) References Cited

U.S. PATENT DOCUMENTS

| 5,298,332 | A | 3/1994 | Andrus et al. |
| 5,824,127 | A | 10/1998 | Bange et al. |
| 5,875,726 | A | 3/1999 | Keilmann |
| 6,128,924 | A | 10/2000 | Bange et al. |
| 7,696,113 | B2 | 4/2010 | Ellison |
| 2006/0242996 | A1 | 11/2006 | DeAngelis et al. |
| 2011/0092353 | A1 | 4/2011 | Amin et al. |
| 2014/0057092 | A1 | 2/2014 | Beall et al. |

FOREIGN PATENT DOCUMENTS

| DE | 231339 | * 12/1985 |
| JP | 2000313638 | * 11/2000 |

OTHER PUBLICATIONS

Fracture Toughness Measurement of Glass and Ceramic Materials Using Chevron-Notched Specimens, 71 J. Am. Ceram. Soc. C-310-C-313 (1988).
International Search Report and Written Opinion PCT/US2017/044066 dated Oct. 5, 2017.

* cited by examiner

Primary Examiner — Karl Group (57) ABSTRACT

A compositional range of manganese aluminosilicate glass-ceramics with high durability, and methods for making the same, are described herein. The glass-ceramics can be used in conjunction with electronic devices, such as in protective exteriors for such devices. The glass-ceramics can be characterized as having ring-on-ring strengths of at least 300 MPa and fracture toughnesses of at least 1.5 MPa·m$^{1/2}$.

28 Claims, 4 Drawing Sheets

KANOITE GLASS-CERAMICS

BACKGROUND

Field

Embodiments relate to glass and glass-ceramic compositions, methods of making the compositions, and articles made from the compositions.

Technical Background

Glasses and/or glass-ceramics may be useful as a protective exterior for handheld electronic devices. In addition to such attributes as strength, hardness or fracture toughness, tints other than the standard "water-white" (glass) or opaque white (glass-ceramic) may be desirable. As a result, there is an unmet need for glasses and/or glass ceramics that meet the desired attribute criteria while having unique and desirable colors.

SUMMARY

A first aspect comprises a glass ceramic composition comprising: 25-45 mol % MnO, 15-25 mol % $Al_2O_3$, and 35-50 mol % $SiO_2$. In some embodiments, the glass-ceramic composition comprises at least 50 to 100% by volume grains having a kanoite crystal structure. In some embodiments, the glass-ceramic composition further comprises >0-15 mol % MgO. In some embodiments, the glass-ceramic composition further comprises less than 5 mol % $TiO_2$ or between >0-<5 mol % $TiO_2$. In some embodiments, the glass-ceramic composition further comprises one or more ingredients selected from the group consisting of >0-5 mol % $Li_2O$, >0-6 mol % $Na_2O$, and >0-6 mol % $Y_2O_3$. In some embodiments, the glass-ceramic composition has a ring-on-ring strength of at least 100 MPa. In some embodiments, the glass-ceramic composition has a fracture toughness of at least 1.5 MPa·m$^{1/2}$.

A second aspect comprises a glass composition comprising: 25-45 mol % MnO, 15-25 mol % $Al_2O_3$, and 35-50 mol % $SiO_2$. In some embodiments, the glass composition further comprises >0-15 mol % MgO. In some embodiments, the glass composition further comprises less than 5 mol % $TiO_2$ or between >0-<5 mol % $TiO_2$. In some embodiments, the glass composition further comprises one or more ingredients selected from the group consisting of >0-5 mol % $Li_2O$, >0-6 mol % $Na_2O$, and >0-6 mol % $Y_2O_3$.

A third aspect comprises an article comprising a glass or glass-ceramic composition as described by any of the embodiments herein. In some embodiments, the article consists essentially of the glass-ceramic composition.

In some embodiments, the article comprises a consumer device, wherein the glass-ceramic composition comprises a part of the consumer device.

In some embodiments, the article comprises a consumer electronic device, and the glass ceramic composition forms a protective exterior over at least a part of the consumer electronic device.

In some embodiments, the glass-ceramic composition comprises at least 50 to 100% by volume grains having a kanoite crystal structure.

In some embodiments, the grains have a grain size of up to 50 µm.

In some embodiments, the glass-ceramic composition further comprises >0-15 mol % MgO.

In some embodiments, the glass-ceramic composition further comprises less than 5 mol % $TiO_2$ or between >0-<5 mol % $TiO_2$.

In some embodiments, the glass-ceramic composition further comprises one or more ingredients selected from the group consisting of >0-5 mol % $Li_2O$, >0-6 mol % $Na_2O$, and >0-6 mol % $Y_2O_3$.

In some embodiments, the glass-ceramic composition has a ring-on-ring strength of at least 100, 150, 200, 250, or 300 MPa.

In some embodiments, the glass-ceramic composition has a fracture toughness of at least 1.5 MPa·m$^{1/2}$.

In some embodiments, the disclosure is directed to an article comprising a glass precursor composition comprising 25-45 mol % MnO, 15-25 mol % $Al_2O_3$, 35-50 mol % $SiO_2$, and less than 5 mol % $TiO_2$.

Another aspect of the disclosure comprises a method of making a glass ceramic composition, the process comprising providing a precursor glass composition comprising 25-45 mol % MnO, 15-25 mol % $Al_2O_3$, and 35-50 mol % $SiO_2$; and heat treating the precursor by subjecting the precursor to a temperature in the range 700-950° C. to form a glass-ceramic composition.

In some embodiments, the heat treating comprises subjecting the precursor, in order, to a nucleation temperature in the range 700-775° C. for 0.5 to 6 hours, and a crystallization temperature in the range 850-950° C. for 0.5 to 6 hours.

In some embodiments, the heat treatment is carried out in an inert atmosphere.

In some embodiments, the glass-ceramic composition comprises at least 50% by volume grains with a kanoite crystal structure and having a grain size of up to 50 µm.

In some embodiments, the grains have a grain size of 0.2 µm to 50 µm.

In some embodiments, the glass-ceramic composition further comprises less than 5 mol % $TiO_2$.

In some embodiments, the glass-ceramic composition further comprises one or more ingredients selected from the group consisting of 0.1-5 mol % $Li_2O$, 0.1-6 mol % $Na_2O$, and 0.1-6 mol % $Y_2O_3$.

In some embodiments, the glass-ceramic composition has a ring-on-ring strength of at least 300 MPa.

In some embodiments, the glass-ceramic composition has a fracture toughness of at least 1.5 MPa·m$^{1/2}$.

DETAILED DESCRIPTION

Definitions

As used herein, the term "grain size" refers to a dimension of a grain in a material. The grain size is observed by cutting and imaging a cross section of the material. The grain size is the average dimension of the particles observed in such a cross section. The average size of a particular grain is the diameter of a circle having the same area as the grain. The average grain size of the material is calculated by adding up the average dimensions of all of the grains in a cross section, and dividing by the number of grains. Typically, yield strength and brittleness both increase with decreasing grain size.

As used herein, the term "CTE" refers to the coefficient of thermal expansion of the glass composition averaged over a temperature range from 20° C. to 300° C.

As used herein, the term "ROR" refers to the strength of a material as measured by the ring-on-ring test, which determines the elastic modulus and fracture strength of brittle materials in plate geometry.

As used herein, the term "fracture toughness" refers to the ability of a material containing a crack to resist fracture, and it is an important property for design applications.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The term "or", as used herein, is inclusive; more specifically, the phrase "A or B" means "A, B, or both A and B". Exclusive "or" is designated herein by terms such as "either A or B" and "one of A or B", for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the", as used herein, also signifies that the modified noun may be singular or plural, again unless otherwise stated in specific instances.

The term "wherein" is used as an open-ended transitional phrase, to introduce a recitation of a series of characteristics of the structure.

As used herein, a glass composition having 0 wt % or 0 mol % of a compound is defined as meaning that the compound, molecule, or element was not purposefully added to the composition, but the composition may still include the compound in trace amounts that do not significantly affect material properties. Similarly, "substantially free of alkali metal", "substantially free of sodium", "substantially free of potassium", "sodium-free," "alkali-free," "potassium-free" or the like are defined to mean that the compound, molecule, or element was not purposefully added to the composition, and is not present in more than trace amounts that do not significantly affect material properties.

Concentrations of various components of glass compositions described herein are expressed in terms of mol % on an oxide basis unless otherwise indicated. Any component having more than one oxidation state may be present in a glass composition in any oxidation state. However, concentrations of such component are expressed in terms of the oxide in which such component is at its lowest oxidation state unless otherwise indicated.

DETAILED DESCRIPTION

Glasses and/or glass ceramics with excellent mechanical properties are desirable for many applications, including use as the protective exterior for all types of hand-held electronic devices.

Mn aluminosilicate glass-ceramic compositions are provided, in which the major silicate phase is the kanoite: $(Mn, Mg)_2Si_2O_6$. Certain Mn aluminosilicate glasses of the disclosure are characterized by internal nucleation upon heat treatment and, thus, can produce uniformly fine-grained glass-ceramics, with grain sizes less than 50 μm, preferably from 200 nm to less than 50 μm, 200 nm to less than 10 μm, or from 200 nm to less than 2 μm, wherein the glass ceramics retain the shape of the original glass object. These materials have been shown to possess ring-on-ring strengths of at least 100, 150, 200, 250, or 300 MPa and fracture toughness values of at least 1.5 $MPa \cdot m^{1/2}$.

Some silicate garnets are known to be high hardness materials. So, a series of experiments with the aim of producing a garnet glass-ceramic from silicate glass were conducted. Most silicate garnets require high pressure for stabilization. However, the Mn garnet spessartite $(Mn_3Al_2Si_3O_{12})$ is a stable liquidus phase at atmospheric pressure—in fact it is the only silicate garnet stable as a liquidus phase at atmospheric pressure—and so glasses containing high nominal concentrations of spessartite±YAG (yttrium aluminate garnet) were synthesized. Despite the low silica content of spessartite (43 mol %), it was found possible to synthesize stable Mn±Y aluminosilicate glasses with silica contents as low as ~30 mol % with very high nominal garnet concentrations. However, when these glasses were heat-treated, they were found to ceram not to a garnet-containing assemblage as might be expected, but instead to one dominated by kanoite—a Mn silicate phase with the clinopyroxene structure. The crystalline fraction was at least 50% by volume kanoite in structure. This surprising result did not then rule these materials out of the original aim, as pyroxene phases may give rise to excellent mechanical properties. Without wishing to be bound by any particular theory, the mechanical properties of pyroxene phases are believed to be due to the anisotropic growth habit of pyroxenes.

The Mn aluminosilicate precursor glasses to kanoite glass-ceramics have a very dark brown (thin) to black (thick or bulk glass) coloration due to the presence of both $Mn^{2+}$ and $Mn^{3+}$ ions (X-ray photoelectron spectroscopy (XPS) has shown that $Mn^{2+}$ ions dominate and MnO is the dominant oxide component). When these glasses are cerammed in air, a grey oxidized surface layer (possibly due to the presence of surface $Mn^{4+}$) is formed while the interior is beige-brown colored. Ceramming in an inert atmosphere, such as nitrogen or argon, avoids this gray surface and the glass-ceramic surface has the same color as the bulk. As a result, kanoite glass-ceramics provide a uniformly opaque material with tints ranging from beige through brown to black with good mechanical properties. Interestingly, when the glasses are heat treated only around the "nucleation" temperature, they develop a highly reflective brass-colored surface due to the formation of a very thin oxidized layer in which $Mn^{3+}$ is the dominant Mn species, as shown by XPS.

In addition, given the relatively high coefficient of thermal expansion (8 ppm/° C.) of kanoite glass-ceramics, they are expansion matched to some chemically strengthened glasses, such as GORILLA® GLASS. Accordingly, the kanoite glass-ceramics described herein may be useful in applications similar to those where chemically strengthened glass is used, such as in protective exteriors for handheld electronic devices. For example, the kanoite glass-ceramics described herein may be used alongside chemically strengthened glass.

The glasses and glass ceramics described herein comprise MnO, $Al_2O_3$ and $SiO_2$. In some embodiments, the compositional range of kanoite glass-ceramics spans the following: 25-45 mol % MnO, 15-25 mol % $Al_2O_3$ and 35-50 mol % $SiO_2$. Additional components may include, but are not limited to, $Li_2O$, $Na_2O$, MgO, $Y_2O_3$, and $TiO_2$. In some embodiments, the kanoite glass-ceramics optionally further comprise 0-9 mol % MgO, preferably 3-9 mol % MgO. Still other optional components may include 0.1-5 mol % $Li_2O$, 0.1-6 mol % $Na_2O$, 0.1-6 mol % $Y_2O_3$ and less than 5 mol % $TiO_2$. It has been found that these materials, present in these amounts, do not interfere with the unexpected formation of the kanoite structure described herein. Without wishing to be bound by theory, it is believed that increased amounts of $Al_2O_3$ may increase viscosity, which may reduce deformation during ceramming.

In some embodiments, the amount of MnO in the glass ceramic is 20-50%. For example, in some embodiments, the amount of MnO in the glass ceramic is 20-50%, 20-45%, 20-40%, 20-35%, 20-34%, 20-28%, 20-25%, 25-50%, 25-45%, 25-40%, 25-35%, 25-34%, 25-28%, 28-50%, 28-45%, 28-40%, 28-34%, 34-50%, 34-45%, 34-40%, 40-50%, 40-45%, or 45-50%. In some embodiments, the amount of MnO in the glass ceramic is 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50%, or within a range including and between any two of these values.

In some embodiments, the amount of $Al_2O_3$ in the glass ceramic is 10-25%. For example, in some embodiments, the amount of $Al_2O_3$ in the glass ceramic is 10-25%, 10-22%, 10-20%, 10-15%, 10-12%, 12-25%, 12-22%, 12-20%, 12-15%, >15-25%, 15-25%, >15-22%, 15-22%, 15-20%, 20-25%, 20-22%, or 22-25%. In some embodiments, the amount of $Al_2O_3$ in the glass ceramic is 10-25% in combination with <5% $TiO_2$, 12-25% in combination with <5% $TiO_2$; 10-22% in combination with <5% $TiO_2$; 12-22% in combination with <5% $TiO_2$. In some embodiments, the amount of $Al_2O_3$ in the glass ceramic is 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, or 25%. In some embodiments, the amount of $Al_2O_3$ in the glass ceramic is 10, 11, 12, 13, 14, 15, 16, 17, 18, 19, 20, 21, 22, 23, 24, or 25%, or within a range including and between any two of these values, each optionally in combination with <5% $TiO_2$.

In some embodiments, the amount of $SiO_2$ in the glass ceramic is 35-50%. For example, in some embodiments, the amount of $SiO_2$ in the glass ceramic is 35-50%, 35-45%, 35-43%, 35-37%, 37-50%, 37-45%, 37-43%, 43-50%, 43-45%, or 45-50%. In some embodiments, the amount of $SiO_2$ in the glass ceramic is 35, 36, 37, 38, 39, 40, 41, 42, 43, 44, 45, 46, 47, 48, 49, or 50%, or within a range including and between any two of these values.

In some embodiments, the amount of MgO in the glass ceramic is 0-9%. For example, in some embodiments, the amount of MgO in the glass ceramic is 0-9, >0-9, 0-6, 0-3, 3-9, 3-6, or 6-9%. In some embodiments, the amount of MgO in the glass ceramic is 0, >0, 1, 2, 3, 4, 5, 6, 7, 8, or 9%, or within a range including and between any two of these values.

Figure 2:
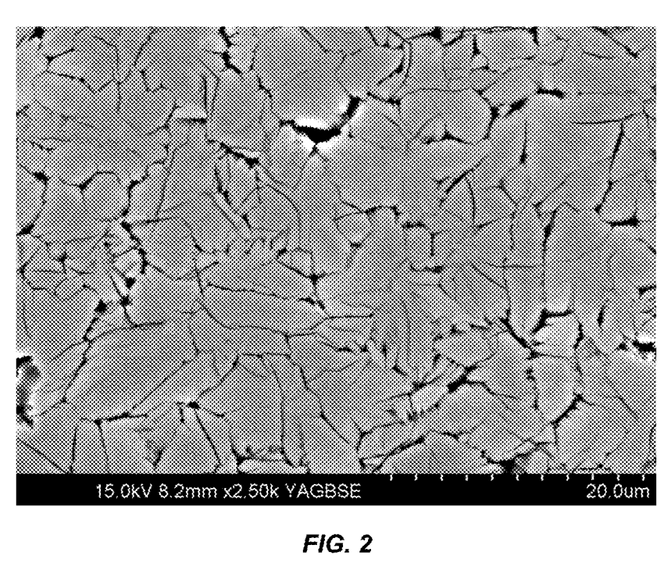
FIG. 2 shows a scanning electron microscope photomicrograph of kanoite (~10 µm diameter grains) glass-ceramic made by ceramming example glass 10 with a nucleation hold for 4 hours at 725° C., followed by a crystallization hold of 4 hours at 850° C.
Figure 3:
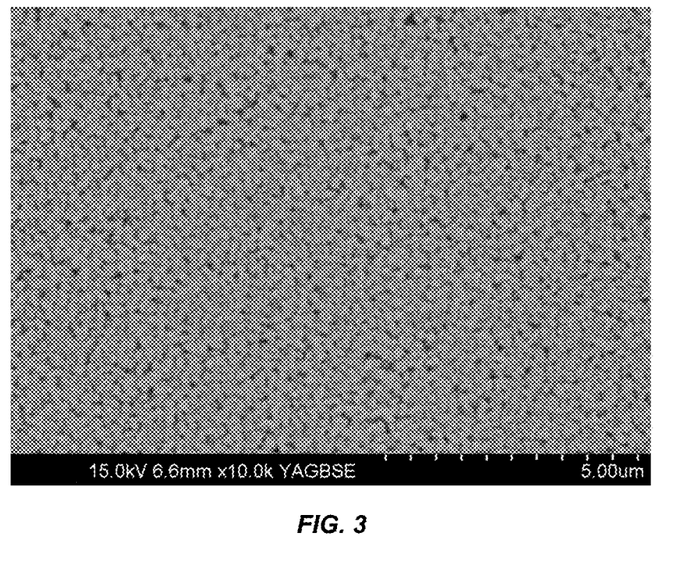
FIG. 3 shows a scanning electron microscope photomicrograph of kanoite (~200 nm diameter grains) glass-ceramic made by ceramming example glass 15 with a nucleation hold for 4 hours at 725° C., followed by a crystallization hold of 4 hours at 850° C.
Figure 4:
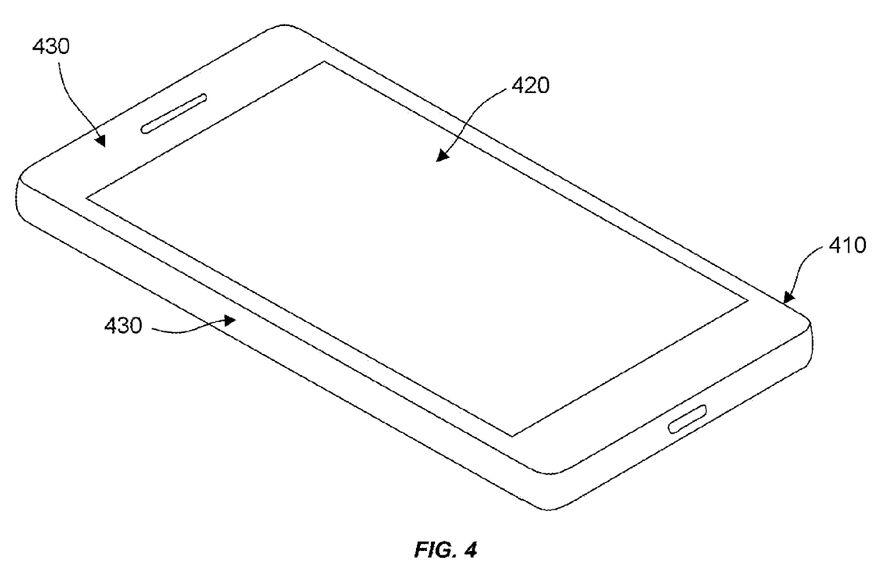
FIG. 4 shows a schematic of a handheld electronic device 410, with cover glass 420 and surfaces 430. The glass-ceramic composition described herein may form a protective exterior over surfaces 430.

In some embodiments, the amount of $TiO_2$ in the glass ceramic is 0-5%, For example, in some embodiments, the amount of $TiO_2$ in the glass ceramic is 0-5%, 0-<5%, 0-4%, 0-<4%, 0-3%, 0-<3%, 0-2%, 0-<2%, 0-1%, 0-<1%, 1-5%, 1-<5%, 1-4%, 1-<4%, 1-3%, 1-<3%, 1-2%, 1-<2%, 2-5%, 2-<5%, 2-4%, 2-<4%, 2-3%, 2-<3%, 3-5%, 3-<5%, 3-4%, 3-<4%, 4-5%, or 4-<5%. In some embodiments, the amount of $TiO_2$ in the glass ceramic is 0, <1, 1, <2, 2, <3, 3, <4, 4, <5, or 5%, or within a range including and between any two of these values. Without wishing to be bound by any particular theory, $TiO_2$ appears to act as a nucleating agent, and can be used to obtain a finer-grained material. For example, the glass-ceramic formed from example glass 10, containing 1.5% $TiO_2$, has a kanoite grain size on the order of 10 μm (FIG. 2). In contrast, higher amounts of $TiO_2$ can have an unwanted effect on the glass-ceramic's mechanical properties. Examples 35 and 36, having 5.9 and 7.4 mol % $TiO_2$, respectively, both show the presence of $MgTiO_3$ (Geikielite), in the crystal phase assemblage.

In some embodiments, the amount of $Li_2O$ in the glass ceramic is 0-5%. For example, in some embodiments, the amount of $Li_2O$ in the glass ceramic is 0-5%, 0-<5%, 0-3%, 0-2%, 0-1%, 1-5%, 1-<5%, 1-3%, 1-2%, 2-5%, 2-<5%, 2-3%, 3-5%, or 3-<5%. In some embodiments, the amount of $Li_2O$ in the glass ceramic is 0, >0, 1, >1, 2, >2, 3, >3, 4, >4, <5, or 5%, or within a range including and between any two of these values.

In some embodiments, the amount of $Na_2O$ in the glass ceramic is 0-5%. For example, in some embodiments, the amount of $Na_2O$ in the glass ceramic is 0-5, 0-<5, 0-4, 0-<4, 0-3, 0-<3, 0-2, 0-<2, 0-1, 0-<1, 1-5, 1-<5, 1-4, 1-<4, 1-3, 1-<3, 1-2, 1-<2, 2-5, 2-<5, 2-4, 2-<4, 2-3, 2-<3, 3-5, 3-<5, 3-4, 3-<4, 4-5, or 4-<5%. In some embodiments, the amount of $Na_2O$ in the glass ceramic is 0, >0, <1, 1, <2, 2, <3, 3, <4, 4, <5, or 5%, or within a range including and between any two of these values.

In some embodiments, the amount of $Y_2O_3$ in the glass ceramic is 0-5%. For example, in some embodiments, the amount of $Y_2O_3$ in the glass ceramic is 0-5, 0-<5, 0-4, 0-<4, 0-3, 0-<3, 0-2, 0-<2, 0-1, 0-<1, >0-5, >0-<5, >0-4, >0-<4, >0-3, >0-<3, >0-2, >0-<2, >0-1, >0-<1, 1-5, 1-<5, 1-4, 1-<4, 1-3, 1-<3, 1-2, 1-<2, 2-5, 2-<5, 2-4, 2-<4, 2-3, 2-<3, 3-5, 3-<5, 3-4, 3-<4, 4-5, or 4-<5%. In some embodiments, the amount of $Y_2O_3$ in the glass ceramic is 0, >0, <1, 1, <2, 2, <3, 3, <4, 4, <5, or 5%, or within a range including and between any two of these values.

In some embodiments, the glass composition above comprise the components listed above along with >0 mol % to 3 mol % of one or more of $SnO_2$, $Fe_2O_3$, or $ZrO_2$, and from 0 to 3 mol % of one or more of ZnO, $Nb_2O_5$, $MoO_3$, $Ta_2O_5$, $WO_3$, $ZrO_2$, $La_2O_3$, $HfO_2$, CdO, $CeO_2$, $F^-$, $Cl^-$, $Br^-$, or $I^-$. In some embodiments, the glass and glass ceramic compositions may comprise additional components as color enhancers or colorants. Such compounds include, for example, $Fe_2O_3$, $Bi_2O_3$, and the like.

As a result of the raw materials and/or equipment used to produce the glass or glass ceramic composition of the present invention, certain impurities or components that are not intentionally added, can be present in the final glass or glass ceramic composition. Such materials are present in the glass or glass ceramic composition in minor amounts and are referred to herein as "tramp materials." Tramp compounds that may be found in glass or glass ceramic embodied herein include, but are not limited to, $Na_2O$, $ZnO$, $Nb_2O_5$, $MoO_3$, $Ta_2O_5$, $WO_3$, $ZrO_2$, $La_2O_3$, $HfO_2$, $CdO$, $SnO_2$, $Fe_2O_3$, $CeO_2$, $As_2O_3$, $Sb_2O_3$, sulfur-based compounds, such as sulfates, halogens, or combinations thereof.

As used herein, a glass or glass ceramic composition having 0 mol % of a compound is defined as meaning that the compound, molecule, or element was not purposefully added to the composition, but the composition may still comprise the compound, typically in tramp or trace amounts. Similarly, "iron-free," "sodium-free," "lithium-free," "zirconium-free," "alkali earth metal-free," "heavy metal-free" or the like are defined to mean that the compound, molecule, or element was not purposefully added to the composition, but the composition may still comprise iron, sodium, lithium, zirconium, alkali earth metals, or heavy metals, etc., but in approximately tramp or trace amounts.

As used herein, tramp or trace amounts do not significantly affect the mechanical properties of a material or composition, such as the fracture toughness or ring-on-ring strength. Tramp or trace amounts are typically less than 0.05 wt % on an oxide basis. While concentrations herein are expressed in terms of mol % on an oxide basis, tramp or trace amounts are expressed in this paragraph as a wt % on an oxide basis.

In some embodiments, the glass or glass ceramic further includes a chemical fining agent. Such fining agents include, but are not limited to, $SnO_2$, $As_2O_3$, $Sb_2O_3$, F, Cl and Br. In some embodiments, the concentrations of the chemical fining agents are kept at a level of 3, 2, 1, or 0.5, >0 mol %. In some embodiments, the fining agent amount is from >0 to 3 mol %. Chemical fining agents may also include $CeO_2$, $Fe_2O_3$, and other oxides of transition metals. These oxides may introduce color to the glass or glass ceramic via visible absorptions in their final valence state(s) in the glass, and thus, when present, their concentration is usually kept at a level of 0.5, 0.4, 0.3, 0.2, 0.1 or >0 mol %.

Compared to $As_2O_3$ and $Sb_2O_3$ fining, tin fining (i.e., $SnO_2$ fining) is less effective, but $SnO_2$ is a ubiquitous material that has no known hazardous properties. Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. U.S. Pat. Nos. 5,785,726, 6,128,924, 5,824,127 and co-pending U.S. application Ser. No. 11/116,669, all of which are hereby incorporated by reference in their entireties, disclose processes for manufacturing arsenic-free glasses. U.S. Pat. No. 7,696,113, incorporated by reference in its entirety, discloses a process for manufacturing arsenic- and antimony-free glass using iron and tin to minimize gaseous inclusions.

The glasses or glass ceramics can also contain $SnO_2$ either as a result of Joule melting using tin-oxide electrodes, through the batching of tin containing materials, e.g., $SnO_2$, $SnO$, $SnCO_3$, $SnC_2O_2$, etc., or through addition of $SnO_2$ as an agent to adjust various physical, melting, and forming attributes. The glass can comprise from 0 to 3 mol %, 0 to 2 mol %, 0 to 1 mol %, 0 to 0.5 mol %, or 0 to 0.1 mol % $SnO_2$.

In some embodiments, the glass can be substantially free of $Sb_2O_3$, $As_2O_3$, or combinations thereof. For example, the glass can comprise 0.05 weight percent or less of $Sb_2O_3$ or $As_2O_3$ or a combination thereof, the glass may comprise zero weight percent of $Sb_2O_3$ or $As_2O_3$ or a combination thereof, or the glass may be, for example, free of any intentionally added $Sb_2O_3$, $As_2O_3$, or combinations thereof.

Additional components can be incorporated into the glass compositions to provide additional benefits or alternatively, can further comprise contaminants typically found in commercially-prepared glass. For example, additional components can be added to adjust various physical, melting, and forming attributes. The glasses, according to some embodiments, can also include various contaminants associated with batch materials and/or introduced into the glass by the melting, fining, and/or forming equipment used to produce the glass (e.g., $ZrO_2$). In some embodiments, the glass may comprise one or more compounds useful as ultraviolet radiation absorbers. In some embodiments, the glass can comprise 3 mol % or less ZnO, $Nb_2O_5$, $MoO_3$, $Ta_2O_5$, $WO_3$, $ZrO_2$, $La_2O_3$, $HfO_2$, CdO, $Fe_2O_3$, $CeO_2$, halogens, or combinations thereof. In some embodiments, the glass can comprise from 0 to 3 mol %, 0 to 2 mol %, 0 to 1 mol %, 0 to 0.5 mol %, 0 to 0.1 mol %, 0 to 0.05 mol %, or 0 to 0.01 mol % ZnO, $Nb_2O_5$, $MoO_3$, $Ta_2O_5$, $WO_3$, $ZrO_2$, $La_2O_3$, $HfO_2$, CdO, $CeO_2$, $Fe_2O_3$, halogens, or combinations thereof.

The term "substantially free," when used to describe the absence of a particular oxide constituent in a glass composition, means that the constituent is present in the glass composition as a contaminant in a trace amount of less than 1 mol %.

In the embodiments of the glass compositions described herein, the concentration of constituent components (e.g., $SiO_2$, $Al_2O_3$, $B_2O_3$ and the like) are given in mole percent (mol %) on an oxide basis, unless otherwise specified.

Figure 1:
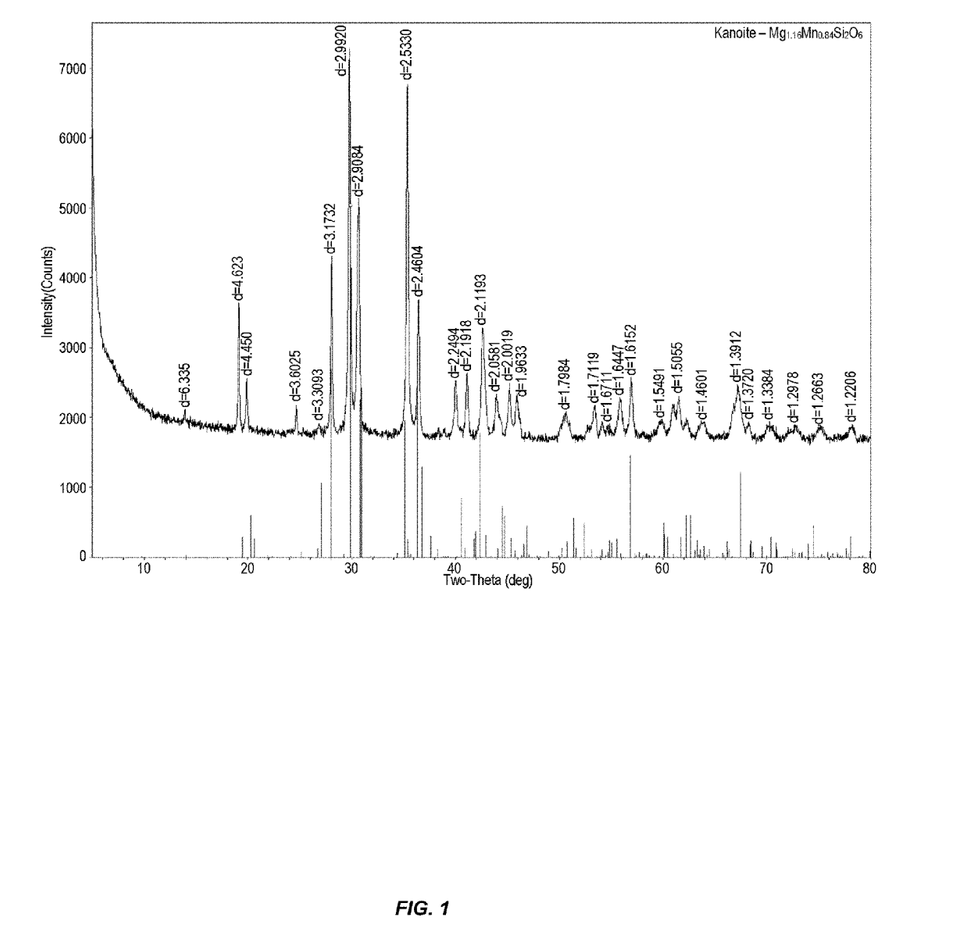
FIG. 1 shows an x-ray diffraction (XRD) scan of glass ceramic made by ceramming example glass 6 with a nucleation hold for 4 hours at 725° C., followed by a crystallization hold of 4 hours at 850° C.

X-ray diffraction results indicate that kanoite is typically the sole crystalline phase detected in these glass-ceramics (cf. FIG. 1). Moreover, these glass-ceramics are highly crystalline as there is usually little or no (as in FIG. 1) indication of a residual glass halo. In addition, the glass-ceramics described herein may contain secondary crystalline phases, such as β-quartz, magnesium titanate, or spinel. In some embodiments, such secondary crystalline phase comprises less than 20, 15, 10, 5, or 3% of the material. In some embodiments, the ratio of kanoite to other crystalline phases is 3:1, 4:1, 5:1, 10:1, 20:1, 50:1 or greater.

Another aspect comprises methods of making glass ceramics from the glass compositions described herein. Kanoite, or Mn pyroxene glass-ceramics, may be formed by a two-step heat treatment of precursor Mn aluminosilicate glasses. As noted in the Examples, a ceram schedule may involve a nucleation hold followed by a crystallization or growth hold.

A nucleation hold for Mn aluminosilicate glass-ceramics may be for 0.5 to 6 hours, preferably for 2 to 6 hours, more preferably for 4 hours. The nucleation hold may be at 700-775° C., preferably at 725-750° C., more preferably at 725° C. Within these ranges, grain sizes generally fall in a desired range that result in superior mechanical properties. In some embodiments, the grain sizes for the embodied glass-ceramics are less than 50 μm, for example from 200 nm to less than 50 µm, 200 nm to less than 10 µm, or from 200 nm to less than 2 µm. At shorter times and lower temperatures, there may be less nucleation than desired, which can lead to a non-uniform microstructure. And at higher temperatures there may be again less nucleation than desired or crystals may begin to grow rapidly. This can lead to wide variation in grain sizes. In some applications, smaller grains, larger grains, or a wide variation in grain sizes may be acceptable.

A crystallization or growth hold for Mn aluminosilicate glass-ceramics may be for 0.5 to 6 hours, for 2 to 6 hours, or for 3-5 hours. The crystallization or growth hold may be, for example, at 800-1000° C., at 850-950° C., or at 850-900° C. Within these ranges, at least 50%, 60%, 70%, at least 75%, at least 80%, at least 85%, 90% or 95% of the material may crystallize to a kanoite crystal structure. At lower temperatures and shorter times, less crystallization may occur. At higher temperature and longer times, larger grains may grow at the expense of smaller grains, leading to fewer and larger grains. But, for some applications, less recrystallization or larger and fewer grains may be acceptable.

In some embodiments, the grains have a grain size of up to 50 µm. For example, in some embodiments, the grains have a grain size of up to 50 µm, up to 25 µm, up to 10 µm, up to 5 µm, up to 4 µm, up to 3 µm, up to 2 µm, up to 1 µm, up to 500 nm, up to 200 nm, 200 nm to 50 µm, 200 nm to 25 µm, 200 nm to 10 µm, 200 nm to 5 µm, 200 nm to 4 µm, 200 to 3 µm, 200 to 2 µm, 200 to 1 µm, 200 to 500 nm, 500 nm to 50 µm, 500 nm to 25 µm, 500 nm to 10 µm, 500 nm to 5 µm, 500 nm to 4 µm, 500 nm to 3 µm, 500 nm to 2 µm, 500 nm to 1 µm, 1 to 50 µm, 1 to 25 µm, 1 to 10 µm, 1 to 5 µm, 1 to 4 µm, 1 to 3 µm, 1 to 2 µm, 2 to 50 µm, 2 to 25 µm, 2 to 10 µm, 2 to 5 µm, 2 to 4 am, 2 to 3 µm, 3 to 50 µm, 3 to 25 µm, 3 to 10 µm, 3 to 5 µm, 3 to 4 µm, 4 to 50 µm, 4 to 25 µm, 4 to 10 µm, 4 to 5 µm, 5 to 50 µm, 5 to 25 µm, 5 to 10 µm, 10 to 50 µm, 10 to 25 µm, or 25 to 50 µm.

The ROR tests were generally performed according to the ASTM C-1499-03 standard test method for Monotonic Equibiaxial Flexural Strength of Advanced Ceramics at Ambient Temperatures, with the load is applied at a rate of 1.2 mm/min, applied at room temperature in 50% relative humidity, wherein the radius of curvature on the rings is 1/16 inch, hereby incorporated by reference. The average RoR, <RoR>, for each composition was a calculated average based on a measurement of at least five RoR tests for the composition. The maximum RoR, $RoR_{max}$, value for each composition was the single highest RoR value found for the composition. As used herein, when not specifically noted, RoR is meant to be the average RoR value for a composition. In preferred embodiments, the glass-ceramic composition has an average ring-on-ring strength of at least 100 MPa. In some embodiments, the glass-ceramic composition has a ring-on-ring strength of at least 100 MPa, at least 150 MPa, at least 200 MPa, at least 250 MPa, at least 300 MPa, at least 350 MPa, at least 400 MPa, 100-500 MPa, 100-400 MPa, 100-350 MPa, 100-300 MPa, 100-250 MPa, 100-200 MPa, 100-150 MPa, 150-500 MPa, 150-400 MPa, 150-350 MPa, 150-300 MPa, 150-250 MPa, 150-200 MPa, 200-500 MPa, 200-400 MPa, 200-350 MPa, 200-300 MPa, 200-250 MPa, 250-500 MPa, 250-400 MPa, 250-350 MPa, 250-300 MPa, 300-500 MPa, 300-400 MPa, 300-350 MPa, 400-500 MPa, or 350-400 MPa. In some embodiments, the glass-ceramic composition has a ring-on-ring strength of 100, 110 120, 130, 140, 150, 160, 170, 180, 190, 200, 210, 220, 230, 240, 250, 260, 270, 280, 290, 300, 310, 320, 330, 340, 350, 360, 370, 380, 390, 400, 425, 450, 475, or 500 MPa, or within a range including and between any two of these values.

In some embodiments, the glass-ceramic composition has a ring-on-ring strength of 55-500 MPa. For example, in some embodiments, the glass-ceramic composition has a ring-on-ring strength of 55-500, 55-400, 55-300, 55-251, 55-202, 55-153, 55-104, 104-300, 104-251, 104-202, 104-153, 153-300, 153-251, 153-202, 202-300, 202-251, or 251-300 MPa. In some embodiments, the glass-ceramic composition has a ring-on-ring strength of 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 400, or 500 MPa, or within a range including and between any two of these values.

Fracture toughness of the samples was found via the chevron-notch four point bend methods described in Reddy et al., *Fracture Toughness Measurement of Glass and Ceramic Materials Using Chevron-Notched Specimens*, 71 J. AM. CERAM. SOC. C-310-C-313 (1988), herein incorporated by reference. The average fracture toughness, <K1c>, for each composition was a calculated average based on a measurement of at least five tests for the composition. The maximum fracture toughness value, $K1c_{max}$ for each composition was the single highest RoR value found for the composition. As used herein, when not specifically noted, fracture toughness is meant to be the average fracture toughness value for a composition. In some embodiments, the glass-ceramic composition has a fracture toughness of at least 1.5. In some embodiments, the glass-ceramic composition has a fracture toughness of at least 1.5, at least 2, at least 2.5, at least 3, at least 3.5, at least 4, at least 4.5, 1.5-5, 1.5-4.5, 1.5-4, 1.5-3.5, 1.5-3, 1.5-2.5, 1.5-2, 2-5, 2-4.5, 2-4, 2-3.5, 2-3, 2-2.5, 2.5-5, 2.5-4.5, 2.5-4, 2.5-3.5, 2.5-3, 3-5, 3-4.5, 3-4, 3-3.5, 3.5-5, 3.5-4.5, 3.5-4, 4-5, or 4-4.5. In some embodiments, the glass-ceramic composition has a fracture toughness of 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5, or within a range including and between any two of these values.

EXAMPLES

Examples of glass and/or glass-ceramic compositions illustrative of this disclosure are given in the following tables. $T_{str}$, $T_{ann}$, $T_s$ refer to strain, anneal and softening points, respectively. As used herein, $\alpha_{300}$ is the coefficient of thermal expansion over the range room temperature (20° C.) to 300° C. <RoR> is the ring-on-ring strength in MPa, with $RoR_{max}$ being the maximum value of this property. Similarly, <K1c> is the fracture toughness in MPa·m$^{1/2}$, with $K1c_{max}$ being the maximum value. The typical ceram schedule includes a nucleation hold for 4 hrs at 725° C., followed by a crystallization hold of approximately 4 hrs at 850° C. and is denoted 725/4, 850/4.

|  | Example | | | | | |
|---|---|---|---|---|---|---|
|  | 1 | 2 | 3 | 4 | 5 | 6 |
|  | mol % | | | | | |
| $MnO_x$ | 38.57 | 34.29 | 40.3 | 35.82 | 33.58 | 34.85 |
| MgO | 4.29 | 8.57 | 0 | 4.48 | 6.72 | 4.55 |
| $Y_2O_3$ | 0 | 0 | 2.24 | 2.24 | 2.24 | 3.03 |
| $Al_2O_3$ | 14.29 | 14.29 | 17.16 | 17.16 | 17.16 | 18.18 |
| $SiO_2$ | 42.86 | 42.86 | 40.3 | 40.3 | 40.3 | 39.39 |
|  | wt % | | | | | |
| $MnO_2$ | 44.3 | 40.5 | 42.8 | 39.1 | 37.1 | 37.3 |
| MgO | 2.29 | 4.7 | 0 | 2.26 | 3.44 | 2.26 |

-continued

|  | Example | | | | | |
|---|---|---|---|---|---|---|
|  | 1 | 2 | 3 | 4 | 5 | 6 |
| $Y_2O_3$ | 0 | 0 | 6.18 | 6.34 | 6.42 | 8.43 |
| $Al_2O_3$ | 19.3 | 19.8 | 21.4 | 21.9 | 22.2 | 22.8 |
| $SiO_2$ | 34.1 | 35 | 29.6 | 30.4 | 30.8 | 29.2 |
| $T_{str}$ | 616 | 632 | 639 | 642 | | |
| $T_{ann}$ | 651 | 668 | 675 | 679 | | |
| $T_s$ | 813 | 820 | 830 | 831 | | |
| α300 | 49.8 | 50.7 | 49.8 | 50.6 | | |
| 725/4, 850/4 | kanoite deformed | kanoite deformed | trace kanoite | kanoite | kanoite | kanoite |
| α300-gc |  |  |  | 81.8 | | |

$\alpha_{300\text{-}gc}$ refers to the coefficient of thermal expansion of the glass-ceramic composition averaged over a temperature range from 20° C. to 300° C.

|  | Example | | | | | | | |
|---|---|---|---|---|---|---|---|---|
|  | 7 | 8 | 9 | 10 | 11 | 12 | 13 | 14 |
|  | mol % | | | | | | | |
| $MnO_x$ | 37.06 | 36.27 | 35.45 | 35.74 | 34.41 | 33.09 | 35.74 | 34.41 |
| MgO | 4.12 | 4.03 | 3.94 | 3.97 | 3.82 | 3.68 | 3.97 | 3.82 |
| $Li_2O$ | 0 | 0 | 0 | 0.74 | 1.47 | 2.21 | 0 | 0 |
| $Na_2O$ | 0 | 0 | 0 | 0 | 0 | 0 | 0.74 | 1.47 |
| $Al_2O_3$ | 17.65 | 19.4 | 21.21 | 16.91 | 16.18 | 15.44 | 16.91 | 16.18 |
| $SiO_2$ | 41.18 | 40.3 | 39.39 | 41.18 | 41.18 | 41.18 | 41.18 | 41.18 |
| $TiO_2$ | 0 | 0 | 0 | 1.47 | 2.94 | 4.41 | 1.47 | 2.94 |
|  | wt % | | | | | | | |
| $MnO_x$ | 42 | 40.9 | 39.7 | 40.8 | 39.6 | 38.4 | 40.7 | 39.4 |
| MgO | 2.17 | 2.11 | 2.04 | 2.1 | 2.04 | 1.98 | 2.1 | 2.03 |
| $Li_2O$ | 0 | 0 | 0 | 0.29 | 0.58 | 0.88 | 0 | 0 |
| $Na_2O$ | 0 | 0 | 0 | 0 | 0 | 0 | 0.6 | 1.2 |
| $Al_2O_3$ | 23.5 | 25.6 | 27.8 | 22.7 | 21.8 | 21 | 22.6 | 21.7 |
| $SiO_2$ | 32.3 | 31.4 | 30.5 | 32.5 | 32.8 | 33 | 32.4 | 32.6 |
| $TiO_2$ | 0 | 0 | 0 | 1.55 | 3.11 | 4.71 | 1.54 | 3.09 |
| $T_{str}$ | 636 |  |  |  |  | 586 |  |  |
| $T_{ann}$ | 670 |  |  |  |  | 622 |  |  |
| $T_s$ | 823 |  |  |  |  |  |  |  |
| α300 | 47.5 |  |  |  |  | 51.7 |  |  |
| 725/4, 850/4 | kanoite | kanoite | kanoite | kanoite | kanoite β-quartz | kanoite β-quartz | kanoite | kanoite |
| \<K1c\> |  |  |  |  |  |  | 1.7 | 1.61 |
| K1c$_{max}$ |  |  |  |  |  |  | 1.72 | 1.69 |
| \<RoR\> |  |  |  |  |  | 91.2 |  | 123 |
| RoR$_{max}$ |  |  |  |  |  | 127 |  | 177 |

| | Example | | | | | |
|---|---|---|---|---|---|---|
| | 15 | 16 | 17 | 18 | 19 | 20 |
| | mol % | | | | | |
| MnO$_x$ | 33.09 | 36.52 | 36 | 35.49 | 32 | 31.55 |
| MgO | 3.68 | 4.06 | 4 | 3.94 | 8 | 7.89 |
| Na$_2$O | 2.21 | 0 | 0 | 0 | 0 | 0 |
| Al$_2$O$_3$ | 15.44 | 17.39 | 17.14 | 16.9 | 17.14 | 16.9 |
| SiO$_2$ | 41.18 | 40.58 | 40 | 39.44 | 40 | 39.44 |
| TiO$_2$ | 4.41 | 1.45 | 2.86 | 4.23 | 2.86 | 4.23 |
| | wt % | | | | | |
| MnO$_2$ | 38 | 41.4 | 40.8 | 40.2 | 37.2 | 36.6 |
| MgO | 1.96 | 2.13 | 2.1 | 2.07 | 4.31 | 4.24 |
| Na$_2$O | 1.8 | 0 | 0 | 0 | 0 | 0 |
| Al$_2$O$_3$ | 20.8 | 23.1 | 22.8 | 22.4 | 23.4 | 23 |

-continued

| | Example | | | | | |
|---|---|---|---|---|---|---|
| | 15 | 16 | 17 | 18 | 19 | 20 |
| SiO$_2$ | 32.7 | 31.8 | 31.3 | 30.9 | 32.1 | 31.6 |
| TiO$_2$ | 4.66 | 1.51 | 2.98 | 4.4 | 3.05 | 4.51 |
| T$_{str}$ | 603 | | | | | |
| T$_{ann}$ | 639 | | | | | |
| T$_s$ | | | | | | |
| α300 | 52.2 | | | | | |
| 725/4, 850/4 | kanoite | kanoite | kanoite | kanoite | kanoite | kanoite |
| <K1c> | 1.39 | 1.56 | 1.72 | 1.73 | | |
| K1c$_{max}$ | 1.45 | 1.56 | 1.89 | 1.93 | | |
| <RoR> | | | | 128 | | |
| RoR$_{max}$ | | | | 207 | | |

| | Example | | | | | | | |
|---|---|---|---|---|---|---|---|---|
| | 21 | 22 | 23 | 24 | 25 | 26 | 27 | 28 |
| | mol % | | | | | | | |
| MnO$_x$ | 30.59 | 29.41 | 34.41 | 33.91 | 32.73 | 31.36 | 27.88 | 30.86 |
| MgO | 7.65 | 7.35 | 3.82 | 3.77 | 3.64 | 3.48 | 6.97 | 7.71 |
| Na$_2$O | 1.47 | 2.21 | 0 | 0 | 1.52 | 2.27 | 2.27 | 2.14 |
| Al$_2$O$_3$ | 16.18 | 15.44 | 20.59 | 20.29 | 19.7 | 18.94 | 18.94 | 12.14 |
| SiO$_2$ | 41.18 | 41.18 | 38.24 | 37.68 | 39.39 | 39.39 | 39.39 | 42.86 |
| TiO$_2$ | 2.94 | 4.41 | 2.94 | 4.35 | 3.03 | 4.55 | 4.55 | 4.29 |
| | wt % | | | | | | | |
| MnO$_2$ | 35.8 | 34.6 | 38.5 | 37.9 | 36.9 | 35.5 | 32.3 | 36.8 |
| MgO | 4.16 | 4.01 | 1.98 | 1.95 | 1.9 | 1.83 | 3.74 | 4.27 |
| Na$_2$O | 1.23 | 1.84 | 0 | 0 | 1.22 | 1.83 | 1.87 | 1.82 |
| Al$_2$O$_3$ | 22.2 | 21.3 | 27 | 26.6 | 26.1 | 25.2 | 25.7 | 17 |
| SiO$_2$ | 33.3 | 33.5 | 29.5 | 29.1 | 30.7 | 30.9 | 31.5 | 35.3 |
| TiO$_2$ | 3.17 | 4.77 | 3.02 | 4.46 | 3.14 | 4.74 | 4.84 | 4.7 |
| 725/4, 850/4 | kanoite | kanoite | kanoite | kanoite | kanoite | kanoite | kanoite | |
| | | MgTiO$_3$ | spinel | spinel | spinel | MgTiO$_3$ | | |
| <RoR> | | 270 | | 139 | | 121 | 139 | 145 |
| RoR$_{max}$ | | 490 | | 183 | | 198 | 163 | 283 |

| | Example | | | | | | | |
|---|---|---|---|---|---|---|---|---|
| | 29 | 30 | 31 | 32 | 33 | 34 | 35 (originally 18) | 36 (originally 19) |
| | mol % | | | | | | | |
| MnO$_x$ | 28.66 | 27.88 | 32.22 | 31.55 | 30.86 | 30.14 | 31.76 | 30.44 |
| MgO | 7.16 | 6.97 | 8.06 | 7.89 | 7.71 | 7.54 | 3.53 | 3.38 |
| Na$_2$O | 2.24 | 2.27 | 0 | 0 | 0 | 0 | 2.94 | 3.68 |
| Al$_2$O$_3$ | 17.16 | 18.94 | 15.28 | 16.9 | 18.57 | 20.3 | 14.71 | 13.97 |
| SiO$_2$ | 40.3 | 39.39 | 40.28 | 39.44 | 38.57 | 37.68 | 41.18 | 41.18 |
| TiO$_2$ | 4.48 | 4.55 | 4.17 | 4.23 | 4.29 | 4.35 | 5.88 | 7.35 |
| | wt % | | | | | | | |
| MnO$_2$ | 33.4 | 32.3 | 37.6 | 36.6 | 35.5 | 34.4 | 36.7 | 35.3 |
| MgO | 3.88 | 3.74 | 4.37 | 4.24 | 4.12 | 3.99 | 1.89 | 1.82 |
| Na$_2$O | 1.86 | 1.87 | 0 | 0 | 0 | 0 | 2.41 | 3.03 |
| Al$_2$O$_3$ | 23.5 | 25.7 | 20.9 | 23 | 25.1 | 27.2 | 19.9 | 19 |
| SiO$_2$ | 32.5 | 31.5 | 32.5 | 31.6 | 30.7 | 29.8 | 32.8 | 33 |
| TiO$_2$ | 4.8 | 4.84 | 4.48 | 4.51 | 4.54 | 4.57 | 6.24 | 7.84 |
| 725/4, 850/4 | | | | | | | kanoite MgTiO$_3$ | kanoite MgTiO$_3$ |
| <RoR> | 163 | 149 | 59 | 84 | 169 | 142 | | |
| RoR$_{max}$ | 225 | 197 | 76 | 121 | 206 | 200 | | |

Examples 1, 2, and 3 are comparative examples. As can be seen from the Table, these compositions have either very little kanoite crystal structure (Example 3), or a deformed kanoite structure (Examples 1 and 2). Without wishing to be bound by any particular theory, it is believed that compositions with lower $Al_2O_3$ (below 15 mol %) suffer deformation during the ceramming step.

In an aspect (1), the disclosure provides an article comprising a glass-ceramic composition comprising: 25-45 mol % MnO, 15-25 mol % $Al_2O_3$, and 35-50 mol % $SiO_2$. In aspect (2), the disclosure provides the article of aspect (1), wherein the article consists essentially of the glass-ceramic composition. In an aspect (3), the disclosure provides the article of aspect (1), wherein the article comprises a consumer device, and the glass-ceramic composition is a part of the consumer device. In an aspect (4), the disclosure provides the article of aspect (1) or aspect (3), wherein the article comprises a consumer electronic device, and the glass ceramic composition forms a protective exterior over at least a part of the consumer electronic device. In an aspect (5), the disclosure provides the article of any one of aspects (1)-(4), wherein the glass-ceramic composition comprises at least 50 to 100% by volume grains having a kanoite crystal structure. In an aspect (6), the disclosure provides the article of any one of aspects (1)-(5), wherein the grains have a grain size of up to 50 μm. In an aspect (7), the disclosure provides the article of any one of aspects (1)-(6), wherein the glass-ceramic composition further comprises 0.1-15 mol % MgO. In an aspect (8), the disclosure provides the article of any one of aspects (1)-(7), wherein the glass-ceramic composition further comprises less than 5 mol % $TiO_2$. In an aspect (9), the disclosure provides the article of any one of aspects (1)-(8), wherein the glass-ceramic composition further comprises one or more ingredients selected from the group consisting of 0.1-5 mol % $Li_2O$, 0.1-6 mol % $Na_2O$, and 0.1-6 mol % $Y_2O_3$. In an aspect (10), the disclosure provides the article of any one of aspects (1)-(9), wherein the glass-ceramic composition has a ring-on-ring strength of at least 300 MPa. In an aspect (11), the disclosure provides the article of any one of aspects (1)-(10), wherein the glass-ceramic composition has a fracture toughness of at least 1.5 $MPa \cdot m^{1/2}$.

In an aspect (12), the disclosure provides an article comprising a glass precursor composition comprising: 25-45 mol % MnO, 15-25 mol % $Al_2O_3$, 35-50 mol % $SiO_2$, and less than 5 mol % $TiO_2$.

In an aspect (13), the disclosure provides a method of making a composition, the process comprising: (a) providing a precursor composition comprising: 25-45 mol % MnO, 15-25 mol % $Al_2O_3$, and 35-50 mol % $SiO_2$; (b) heat treating the precursor by subjecting the precursor to a temperature in the range 700-950° C. to form a glass-ceramic composition. In an aspect (14), the disclosure provides the method of aspect (13), wherein the heat treating comprises: subjecting the precursor, in order, to: a nucleation temperature in the range 700-775° C. for 0.5 to 6 hours, and a crystallization temperature in the range 850-950° C. for 0.5 to 6 hours. In an aspect (15), the disclosure provides the method of aspect (13) or aspect (14), wherein the heat treatment is carried out in an inert atmosphere. In an aspect (16), the disclosure provides the method of any of aspects (13)-(15), wherein the glass-ceramic composition comprises at least 50% by volume grains with a clinopyroxene crystal structure and having a grain size of up to 50 μm. In an aspect (17), the disclosure provides the method of any of aspects (13)-(16), wherein the grains have a grain size of 0.2 μm to 50 μm. In an aspect (18), the disclosure provides the method of any of aspects (13)-(17), wherein the glass-ceramic composition further comprises less than 5 mol % $TiO_2$. In an aspect (19), the disclosure provides the method of any of aspects (13)-(18), wherein the glass-ceramic composition further comprises one or more ingredients selected from the group consisting of 0.1-5 mol % $Li_2O$, 0.1-6 mol % $Na_2O$, and 0.1-6 mol % $Y_2O_3$. In an aspect (20), the disclosure provides the method of any of aspects (13)-(19), wherein the glass-ceramic composition has a ring-on-ring strength of at least 300 MPa. In an aspect (21), the disclosure provides the method of any of aspects (13)-(20), wherein the glass-ceramic composition has a fracture toughness of at least 1.5 $MPa \cdot m^{1/2}$.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

In an aspect (22), the disclosure provides a glass-ceramic composition comprising: 25-45 mol % MnO, 15-25 mol % $Al_2O_3$, and 35-50 mol % $SiO_2$. In an aspect (23), the disclosure provides the glass ceramic of aspect (22), wherein the glass-ceramic composition comprises at least 50 to 100% by volume grains having a kanoite crystal structure. In an aspect (24), the disclosure provides the glass ceramic of aspect (23), wherein the grains have a grain size of up to 50 μm. In an aspect (25), the disclosure provides the method of any of aspects (22)-(24), wherein the glass-ceramic composition further comprises 0.1-15 mol % MgO. In an aspect (26), the disclosure provides the method of any of aspects (22)-(25), wherein the glass-ceramic composition further comprises less than 5 mol % $TiO_2$. In an aspect (27), the disclosure provides the method of any of aspects (22)-(26), wherein the glass-ceramic composition further comprises one or more ingredients selected from the group consisting of 0.1-5 mol % $Li_2O$, 0.1-6 mol % $Na_2O$, and 0.1-6 mol % $Y_2O_3$. In an aspect (28), the disclosure provides the method of any of aspects (22)-(27), wherein the glass-ceramic composition has a ring-on-ring strength of at least 300 MPa. In an aspect (29), the disclosure provides the method of any of aspects (22)-(28), wherein the glass-ceramic composition has a fracture toughness of at least 1.5 $MPa \cdot m^{1/2}$.

In an aspect (30), the disclosure provides a glass precursor composition comprising: 25-45 mol % MnO, 15-25 mol % $Al_2O_3$, 35-50 mol % $SiO_2$, and less than 5 mol % $TiO_2$.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. An article comprising:
   a glass-ceramic composition comprising:
   25-45 mol % MnO,
   >0 mol % MgO,
   15-25 mol % $Al_2O_3$, and
   35-50 mol % $SiO_2$, wherein the glass-ceramic composition comprises a plurality of grains having a major silicate phase, the major silicate phase having a kanoite crystal structure and composition $(Mn,Mg)_2Si_2O_6$.

2. The article of claim 1, wherein the article comprises the glass-ceramic composition.

3. The article of claim 1, wherein the article comprises a consumer device, and the glass-ceramic composition is a part of the consumer device.

4. The article of claim 1, wherein the article comprises a consumer electronic device, and the glass ceramic composition forms a protective exterior over at least a part of the consumer electronic device.

5. The article of claim 1, wherein the glass-ceramic composition comprises at least 50 to 100% by volume of the plurality of grains having the kanoite crystal structure.

6. The article of claim 1, wherein each of the plurality of grains has a grain size of up to 50 μm.

7. The article of claim 1, wherein the glass-ceramic composition further comprises 0.1-15 mol % MgO.

8. The article of claim 1, wherein the glass-ceramic composition further comprises less than 5 mol % $TiO_2$.

9. The article of claim 1, wherein the glass-ceramic composition further comprises one or more ingredients selected from the group consisting of 0.1-5 mol % $Li_2O$, 0.1-6 mol % $Na_2O$, and 0.1-6 mol % $Y_2O_3$.

10. The article of claim 1, wherein the glass-ceramic composition has a ring-on-ring strength of at least 300 MPa.

11. The article of claim 1, wherein the glass-ceramic composition has a fracture toughness of at least 1.5 $MPa \cdot m^{1/2}$.

12. A method of making a composition, the process comprising:
   providing a precursor composition comprising:
   25-45 mol % MnO,
   >0 mol % MgO,
   15-25 mol % $Al_2O_3$, and
   35-50 mol % $SiO_2$;
   heat treating the precursor by subjecting the precursor to a temperature in the range 700-950° C. to form a glass-ceramic composition wherein the glass-ceramic composition comprises a plurality of grains having a major silicate phase, the major silicate phase having a kanoite crystal structure and composition $(Mn,Mg)_2Si_2O_6$.

13. The method of claim 12, wherein the heat treating comprises:
   subjecting the precursor, in order, to:
   a nucleation temperature in the range 700-775° C. for 0.5 to 6 hours, and
   a crystallization temperature in the range 850-950° C. for 0.5 to 6 hours.

14. The method of claim 12, wherein the heat treatment is carried out in an inert atmosphere.

15. The method of claim 12, wherein the glass-ceramic composition comprises at least 50% by volume of the plurality of grains with kanoite crystal structure, and wherein each of the plurality of grains has a grain size of up to 50 μm.

16. The method of claim 12, wherein each of the plurality of grains has a grain size of 0.2 μm to 50 μm.

17. The method of claim 12, wherein the glass-ceramic composition further comprises less than 5 mol % $TiO_2$.

18. The method of claim 12, wherein the glass-ceramic composition further comprises one or more ingredients selected from the group consisting of 0.1-5 mol % $Li_2O$, 0.1-6 mol % $Na_2O$, and 0.1-6 mol % $Y_2O_3$.

19. The method of claim 12, wherein the glass-ceramic composition has a ring-on-ring strength of at least 300 MPa.

20. The method of claim 12, wherein the glass-ceramic composition has a fracture toughness of at least 1.5 $MPa \cdot m^{1/2}$.

21. A glass-ceramic composition comprising:
   25-45 mol % MnO,
   >0 mol % MgO,
   15-25 mol % $Al_2O_3$, and
   35-50 mol % $SiO_2$, wherein the glass-ceramic composition comprises a plurality of grains having a major silicate phase, the major silicate phase having a kanoite crystal structure and composition $(Mn,Mg)_2Si_2O_6$.

22. The composition of claim 21, wherein the glass-ceramic composition comprises at least 50 to 100% by volume of the plurality of grains having the kanoite crystal structure.

23. The composition of claim 22, wherein each of the plurality of grains has a grain size of up to 50 μm.

24. The composition of claim 21, wherein the glass-ceramic composition further comprises 0.1-15 mol % MgO.

25. The composition of claim 21, wherein the glass-ceramic composition further comprises less than 5 mol % $TiO_2$.

26. The composition of claim 21, wherein the glass-ceramic composition further comprises one or more ingredients selected from the group consisting of 0.1-5 mol % $Li_2O$, 0.1-6 mol % $Na_2O$, and 0.1-6 mol % $Y_2O_3$.

27. The composition of claim 21, wherein the glass-ceramic composition has a ring-on-ring strength of at least 300 MPa.

28. The composition of claim 21, wherein the glass-ceramic composition has a fracture toughness of at least 1.5 $MPa \cdot m^{1/2}$.

* * * * *